UNITED STATES PATENT OFFICE.

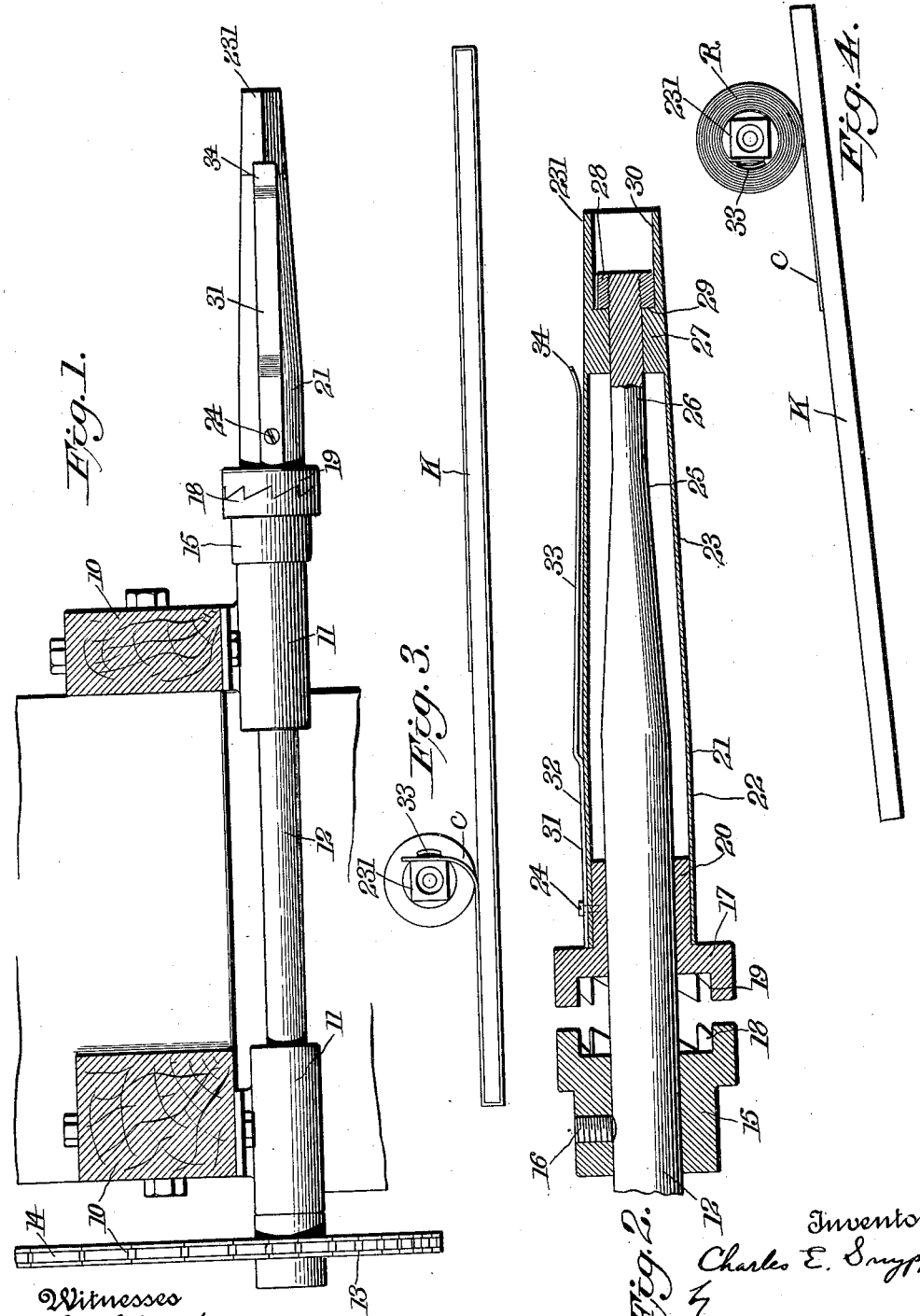

CHARLES E. SNYPP, OF GRETNA, LOUISIANA.

CAKE-STRIPPER.

1,102,698.   Specification of Letters Patent.   Patented July 7, 1914.

Application filed May 4, 1914. Serial No. 836,301.

*To all whom it may concern:*

Be it known that I, CHARLES E. SNYPP, a citizen of the United States, residing at Gretna, Jefferson parish, State of Louisiana, have invented certain new and useful Improvements in Cake-Strippers, of which the following is a specification.

My invention relates to a device for stripping the press cloths from compressed cakes of cotton seed meal and the like.

At present the cloths are usually pulled loose by hand which requires a considerable amount of labor. It is especially desirable to employ mechanical or power driven means for removing the cloths because in the new methods of milling it is desirable to leave moisture in the cake and with the added moisture the cloths adhere to the cake proportionately to the amount of moisture added. As it takes a very strong man to pull these cloths loose, a device of this nature will be the means of saving much manual labor.

My invention has for its principal objects to provide a device simple in construction and simple to operate.

A further object is to provide a device which may be set in operation and part of which will be in operation continuously while the device is in use so as to eliminate the necessity of constantly starting and stopping the device.

The above and other objects and the novel features of my invention will be apparaent from the following description taken in connection with the drawings, in which, Figure 1 is a side elevation of a stripper embodying my invention as it appears when mounted in operative position on the wall of a building, the clutch being shown in operating position. Fig. 2 is a longitudinal sectional view of part of Fig. 1, on an enlarged scale, the clutch being shown released. Figs. 3 and 4 are end views showing the cloth covering being removed from the cake at the beginning and near the ending of the operation, respectively.

Referring to the drawing, the numerals 10, 10 designate beams or other suitable supports for the bearings 11, 11 in which the shaft 12 is rotatably mounted. At one end of the shaft 12 there is a sprocket wheel 13, the teeth of which are engaged by a chain or link belt 14 connected to an overhead line shafting or other source of power for rotating the shaft 12 continuously while the stripper is in use. The belt 14 may be started and stopped by the usual belt shifter or other suitable means, not shown.

One element 15 of a clutch is rigidly secured to the shaft 12 by means of a hollow set screw 16 and the other element 17 of the clutch is freely slidable longitudinally of the shaft 12 into and out of engagement with the clutch element 15, the said clutch elements being provided with coöperating teeth 18 and 19 on their engaging faces.

The clutch element 17 has a laterally extending hub portion 20 of a size to fit into the end of a sleeve 21 which has a portion 22 of uniform diameter and a portion 23 which tapers to the outer end of the same. The sleeve is shrunk onto the hub portion 20 and also held in place thereon by means of suitable securing screws 24 so that it will move with the clutch element 17 and rotate when the latter is in engagement with the clutch element 15. The sleeve 12 has a square part 231 at its outer end to help keep the roll of cloth from turning.

The outer end of the shaft 12 tapers as at 25 and has a portion 26 at the end thereof which is of reduced diameter. The end 26 of the shaft extends through a bearing flange 27 on the interior of the sleeve 21 and is threaded at its outer end to receive the nut 28 which rests against the shoulder 29 on the outer side of the flange 27. A recess 30 in the end of the sleeve 21 beyond the flange 27 is of a size to receive the nut 28 and of such a depth that the sleeve may move longitudinally on the shaft 12 in either direction and not expose the nut 28. The nut 28 limits the movement of the sleeve outwardly and when the sleeve with its attached clutch member moves a certain distance inwardly it will be engaged and rotated by the clutch member 15 on the shaft 12.

The sleeve 21 is provided with a gripping member which is curved transversely and comprises a portion 31 fitting flat against the portion 22 of the sleeve and secured thereto by the fastening devices 24 and 32, and an offset portion 33 which lies parallel to but is spaced from the tapering portion 23 of the sleeve and has an outwardly curved extending end 34. The offset portion 33 of the gripping member is resilient and is designed to receive the end of a press cloth in the space between it and the tapering part of the sleeve.

The operation of the device is as follows: The end of a cloth C, which covers the sides and top and bottom of a cake K and terminates usually at the center of the cake, is loosened for a few inches so that the said end may be pushed in the space between the gripping member 33 and the sleeve 21. The cake K and the sleeve carrying the clutch member 17 are pushed longitudinally of the shaft 12 into clutch with the element 15 whereby the sleeve will be rotated and as the cake is held stationary the cloth will be wound therefrom onto the tapering end of the sleeve as is shown in Figs. 3 and 4. When the cloth has been removed from the cake and wound onto the sleeve, it may be removed from the latter by slightly depressing the end 34 of the gripping member and drawing the roll of cloth toward the end of the tapering sleeve. The rotation of the sleeve may be stopped or interrupted at any time by drawing the sleeve with its attached clutch member toward the outer end of the shaft, the outward movement being limited by the nut 28.

From the foregoing it will be seen that I have provided a simple and efficient device for stripping cloths from the compressed cakes and as it is obvious that numerous changes may be made without departing from the spirit of the invention I do not wish to be limited to the exact details as shown and described.

Having thus described the invention, what is claimed as new and desired to be secured by Letters Patent is:

1. In a device for stripping the cover from compressed cakes, the combination of a rotatable shaft, cover gripping means movable longitudinally of the shaft, and means for coupling the gripping means to said shaft.

2. In a device for stripping cloths from compressed cakes, the combination of a rotatable shaft, means for gripping a cloth and for supporting the same as it is stripped from the cake, said means having limited longitudinal movement on said shaft, and means whereby said gripping and supporting means may be coupled to rotate with said shaft by moving the same longitudinally of the shaft in one direction and uncoupled by moving the same along the shaft in the opposite direction.

3. In a stripping device of the class described, the combination of a rotatable shaft, a sleeve slidable longitudinally thereof, a gripper movable with said sleeve, and means for coupling the sleeve to the shaft.

4. In a stripping machine of the class described, the combination of a shaft rotatable continuously while the machine is in use, gripping means movable longitudinally of the shaft while the latter is rotating, and means whereby said gripping means may be coupled to and uncoupled from said rotating shaft as said gripping means is moved longitudinally in one direction or the other.

5. In a stripping machine of the class described, the combination of a shaft constantly rotative while the machine is in use, a sleeve mounted so as to be slidable longitudinally of the shaft while the latter is rotating, gripping means on said sleeve, means for coupling said sleeve to said shaft, and means for limiting the movement of said sleeve.

6. In a stripping machine of the class described, the combination of a shaft, a tapering sleeve movable longitudinally of the shaft, gripping means mounted on the sleeve, and means whereby the sleeve and shaft may be readily coupled and uncoupled.

7. In a machine for stripping press cloths from press cakes, the combination of a shaft constantly rotatable and having a threaded end, a clutch element mounted to rotate with the shaft, a sleeve and a second clutch element rigidly connected together and slidable longitudinally of said shaft, said second clutch element being movable into and out of engagement with said first mentioned clutch element, an offset resilient gripping member secured to said sleeve, and a nut fitting the threaded end of the shaft to limit the longitudinal movement of the sleeve.

In testimony whereof I affix my signature in presence of two witnesses.

CHARLES E. SNYPP.

Witnesses:
  LOUIS L. DANENHAUER,
  LOUIS R. LAPEYRONNIE.